Figure 1:
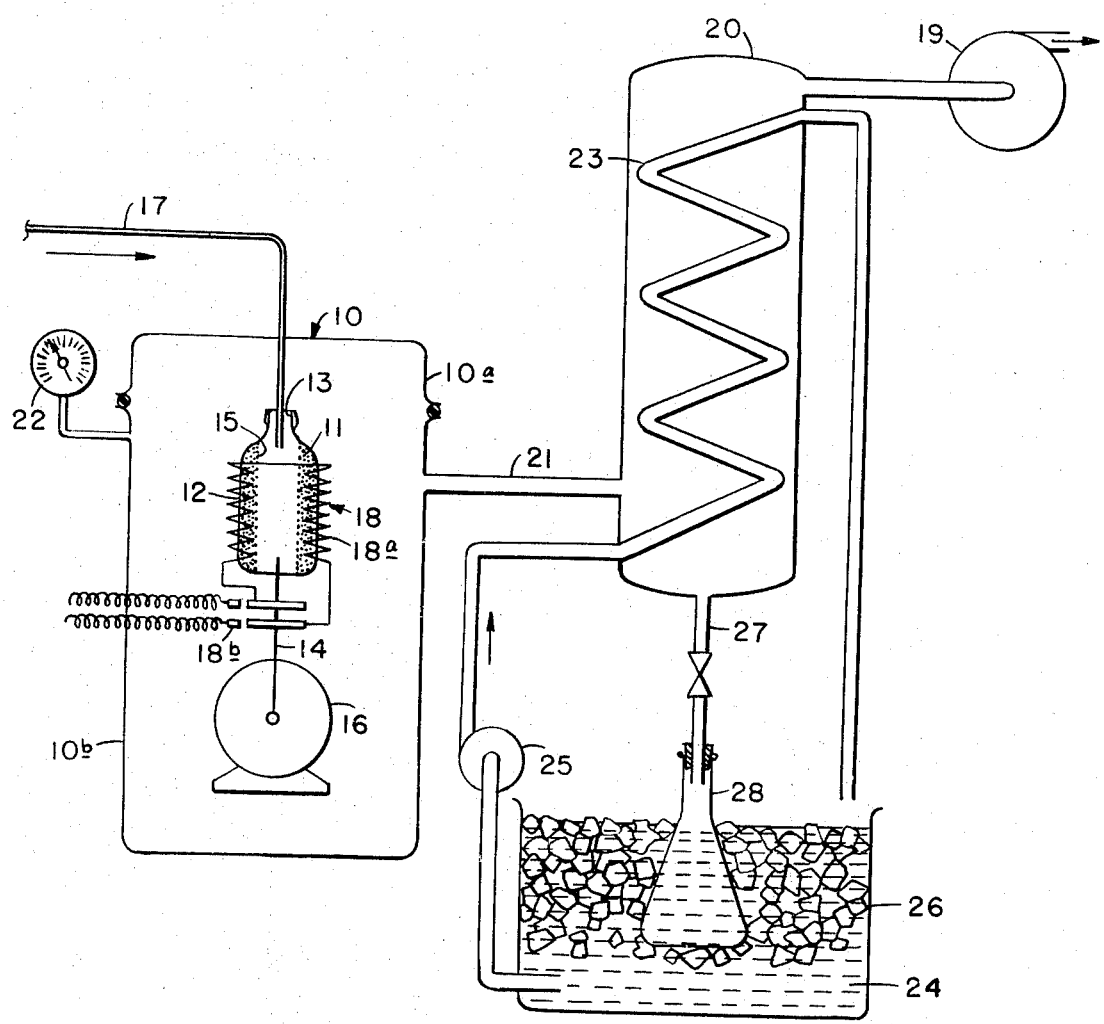

United States Patent [19]
Lucas

[11] 3,871,574
[45] Mar. 18, 1975

[54] METHOD AND APPARATUS FOR CONCENTRATING THERMO-LABILE FLUIDS

[75] Inventor: Victor Grifols Lucas, Barcelona, Spain

[73] Assignee: Laboratories Grifols S/A, Barcelona, Spain

[22] Filed: July 5, 1973

[21] Appl. No.: 376,726

[30] Foreign Application Priority Data
July 6, 1972 Spain..................................404902

[52] U.S. Cl.................................. 233/11, 233/19 A
[51] Int. Cl.......................... B04b 5/10, B04b 15/02
[58] Field of Search............. 233/11, 26, 19 R, 19 A

[56] References Cited
UNITED STATES PATENTS

| | | | |
|---|---|---|---|
| 3,274,756 | 9/1966 | Stern.................................. | 233/11 X |
| 3,304,990 | 2/1967 | Ontko et al........................ | 233/26 X |
| 3,317,125 | 5/1967 | Holden .............................. | 233/11 |
| 3,727,832 | 4/1973 | Maclin et al....................... | 233/26 X |
| 3,734,400 | 5/1973 | Pfeiffer .............................. | 233/11 |

FOREIGN PATENTS OR APPLICATIONS

| | | | |
|---|---|---|---|
| 639,208 | 12/1936 | Germany ............................. | 233/11 |

Primary Examiner—George H. Krizmanich
Attorney, Agent, or Firm—Dawson, Tilton, Fallon and Lungmus

[57] ABSTRACT

A method and apparatus for concentrating thermolabile fluids, particularly biological fluids, which tend to become denatured and to foam when heated to boiling temperatures. In performing the method, a thermolabile liquid having a volatile component is confined in a container so that when the container and its contents are centrifuged, a substantial liquid-gas interface will be formed. During centrifugation, the pressure within the container is reduced to cause rapid volatilization of the volatile component at a temperature well below the denaturization temperature of the liquid. Centrifugation is performed at a speed sufficient to substantially eliminate foaming of the liquid during such volatilization. Moderate heating of the container and its contents to promote such volatilization may be provided. The centrifuging, gasevacuating, and heating steps are all performed simultaneously and are continued until the concentration of the liquid has been increased a predetermined extent.

7 Claims, 1 Drawing Figure

3,871,574

METHOD AND APPARATUS FOR CONCENTRATING THERMO-LABILE FLUIDS

BACKGROUND

Situations arise in laboratory procedures, particularly procedures involving the testing of biological fluids, where the testing would be facilitated if the concentration of the liquid, ordinarily an aqueous solution, were increased. While boiling of the solution in an open vessel would be an obvious method for increasing concentration, such a method is not suitable in many instances because of the destruction, inactivation, or denaturization of the solute at the elevated temperature, and because of the formation of a relatively stable foam at the gas-liquid interface. The problem of thermo-instability might be reduced by boiling the liquid at reduced pressures, so that temperatures do not reach the denaturization level; however, such a low-temperature procedure would still involve undesirable foam formation.

Other techniques for increasing concentration, such as ultrafiltration or the use of water absorbents, are generally unsatisfactory not only because they are slow but also because of the risks of contamination and denaturization of the product.

SUMMARY

An important aspect of this invention lies in providing a method and apparatus for concentrating biological liquids at relatively low temperatures, well below denaturization temperatures, without boiling and without the risks of contamination described above. The method comprises the steps of confining the liquid in a container in such a way that a substantial liquid-gas interface is defined, then centrifuging the container and its contents while simultaneously reducing the gas pressure within the container to cause rapid volatilization at a temperature well below the denaturization temperature of the liquid, and continuing the simultaneous centrifugation and pressure reduction steps until the concentration of the liquid has been increased a predetermined extent. The concentrating operation may be promoted by the application of heat at a level below the denaturization temperature of the liquid. The speed of centrifugation, and the extent of centrifugal force generated thereby, and the amount of heat which may be applied to promote volatilization, depend on the particular liquid involved. Thus, the centrifuging step should be conducted at a speed sufficient to substantially eliminate the foaming of the liquid during the process of rapid volatilization.

The container is of generally cylindrical shape and is rotated about its own axis during the centrifuging operation. In one form of the invention, the container is enclosed in a vacuum chamber, the container having an opening or mouth through which gas, including the vapors of the volatile liquid, are extracted from the container during evacuation of the chamber. Additional liquid may be supplied to the container during the concentrating procedure by introducing it through the container's mouth. Heat is preferably applied directly to the side wall of the container, the heat being transmitted to the liquid, and generally uniformly heating the liquid by convection, during the centrifuging operation. Measurement of the extent of concentration may be readily made by condensing the vapor extracted from the container and ascertaining the volume of the condensed liquid.

DRAWINGS

FIG. 1 is a somewhat schematic view illustrating an apparatus for performing the method of this invention.

DESCRIPTION

Referring to the drawings, the numeral 10 generally designates a hermetically-sealable vacuum chamber having a cover section 10a and a base section 10b. Within the chamber is a container which, in the illustration given, takes the form of a standard bottle used for blood collection. As shown, the container has a generally cylindrical side wall 12 and a neck defining an opening 13. The container is supported with its axis extending vertically and its mouth opening facing upwardly by suitable rotary supporting means diagrammatically represented at 14. It is to be understood that any suitable means may be used to support the container for rotation about its vertical axis. Reference is made to United States Pat. No. 3,460,752 which discloses supporting and driving means that might be adapted for this purpose, it being understood that the aforementioned patent is otherwise concerned with an entirely different operation (performing plasmapheresis in situ) and that any adaptation of the patented construction for purposes of this invention would require an inversion of the patented assembly so that the parts assume the relationship shown and described herein.

A liquid 15 is shown within container 11 in the position it would assume when the container is rotated at centrifuging speeds about the container's axis. The liquid is thermo-labile and includes an aqueous component or other volatile component. In most cases such liquid will constitute a biological fluid such as, for example, blood; however, other fluids which include volatile components and which also present the problems of heat instability and relatively stable foam formation may be involved. It will be observed that when the fluid is supported within the container in the manner illustrated, a substantial liquid-gas interface is provided within that container.

A suitable motor, represented schematically at 16 in the drawings, is operatively connected to support means 14 for rotating container 11 about its axis. The rotational speed of the container will vary considerably depending on the nature of its liquid contents and the amount of centrifugal force necessary to retard stable foam formation; however, such speeds would be expected to fall within the range of approximately 500 to 5,000 revolutions per minute.

A supply tube 17 extends through the cover of the sealed chamber 10 and into the open neck of container 11 to supply liquid 15 to the container as needed. Liquid to be concentrated may be supplied to the container through feed tube 17 either during rotation of the container or while it is stationary.

To promote evaporation of the volatile component at a temperature sufficiently low to avoid denaturization of the heat-labile components, I provide heating means 18 which includes an electrical heating coil 18a extending about the cylindrical side wall of container 11. The resistance coil is supplied with low voltage current (to avoid short circuits by ionization) across an arrangement of contact rings and brushes 18b illustrated diagrammatically in FIG. 1. While I have shown an electrical resistance coil for purposes of heating the contents of the container, it is to be understood that other types of heating means, such as an infrared emitter, might be used.

Vacuum chamber 10 is evacuated by a suitable pump 19 which communicates with a condenser 20, the condenser in turn communicating through passage 21 with chamber 10. A standard gauge 22 registers the extent of evacuation of gas from the chamber. A cooling coil 23 is disposed within the condenser and carries cooling fluid 24 circulated by pump 25. In the simplified construction illustrated, the cooling fluid is water pumped from ice bath 26 but it is to be understood that other standard types of refrigeration systems may be utilized for cooling condenser coil 23. Liquid condensing within condenser 20 flows downwardly through passage 27 into an appropriate receptacle 28, the volume of liquid collected in the receptacle, when compared with the amount of fluid introduced into container 11 through passage 17, constituting a direct indication of the extent to which liquid 15 has been concentrated.

It is believed apparent from the foregoing that the speed of concentration of liquid 15, that is, the rate of its volatilization, may be varied in accordance with changes in temperature and pressure. As gas (air) is evacuated from chamber 10, gas, including the volatilized component of liquid 15, is also withdrawn from container 11. The reduction in pressure within the container promotes evaporation of the liquid. Such evaporation is also promoted by the heating effect of heating means 18. As previously indicated, the particular negative pressure and temperature used depends on the characteristics of the liquid to be concentrated. The same considerations apply in determining the amount of centrifugal force to be generated. More specifically, the liquid 15 should be heated to a temperature below its denaturization temperature and the rate of volatilization, as determined by the increased temperature and reduced pressure, should be maintained at a level at which foaming will be prevented, or the formation of foam will be immediately dissipated, by the centrifugal force to which the liquid is subjected.

It is believed that in performing the method of this invention, currents are produced inside the container similar to convection currents, thereby resulting in the distribution of heat throughout the liquid undergoing centrifugation. In other words, the surface layer of molecules of liquid at the gas-liquid interface is continually renewed as the molecules of liquid impinge on the heated walls of the container and then return to the gas interface where the volatile component or components of the liquid ultimately pass into a vapor state and are evacuated from the container 11 and chamber 10.

While in the foregoing an embodiment of the invention has been disclosed in considerable detail for purposes of illustration, it will be understood by those skilled in the art that many of these details may be varied without departing from the spirit and scope of the invention.

I claim:

1. A method for concentrating a thermo-labile liquid having a volatile component, comprising the steps of confining said liquid in a container to provide a substantial liquid-gas interface, centrifuging said liquid by rotating said container about its own axis while simultaneously reducing the gas pressure within said container to cause rapid volatilization of said volatile component at a temperature below the denaturization temperature of said liquid, said centrifuging step being performed at a speed sufficient to substantially eliminate foaming of said liquid, and continuing said simultaneous centrifugation and pressure reduction steps until the concentration of said liquid has been increased a predetermined extent.

2. The method of claim 1 in which said liquid is supplied axially to said container during said centrifuging and pressure reducing steps.

3. The method of claim 1 in which there is the further step of extracting vaporized liquid from said container and thereafter condensing such vapor.

4. An apparatus for concentrating a thermo-labile liquid having a volatile component, comprising a container adapted to be partially filled with said liquid and having a generally cylindrical side wall, said container being mounted for rotation about its own vertical axis, means for rotating said container about said axis to cause said liquid to spread about said cylindrical side wall and thereby provide a substantial liquid-gas interface when said container and its contents are rotated for centrifuging the liquid contents thereof, and means for simultaneously reducing the pressure within said container to produce rapid volatilization of said liquid during centrifugation and for withdrawing vaporized liquid from said container.

5. The apparatus of claim 4 in which said container is mounted within a hermetically-sealable chamber, said container having an axial top opening placing the interior of said chamber in communication with the interior of said container, said means for reducing pressure within said container including a pump for evacuating gas from said chamber and container, and a liquid supply tube extending into said opening along said axis for introducing liquid into said container.

6. The apparatus of claim 4 in which means are provided for simultaneously heating said container and its contents while said liquid is centrifuged and exposed to reduced pressure.

7. The apparatus of claim 4 in which means are provided for condensing vaporized liquid after the same has been extracted from said container.

* * * * *